F. HACHMANN.
CULINARY IMPLEMENT.
APPLICATION FILED APR. 3, 1916.
1,194,838.
Patented Aug. 15, 1916.
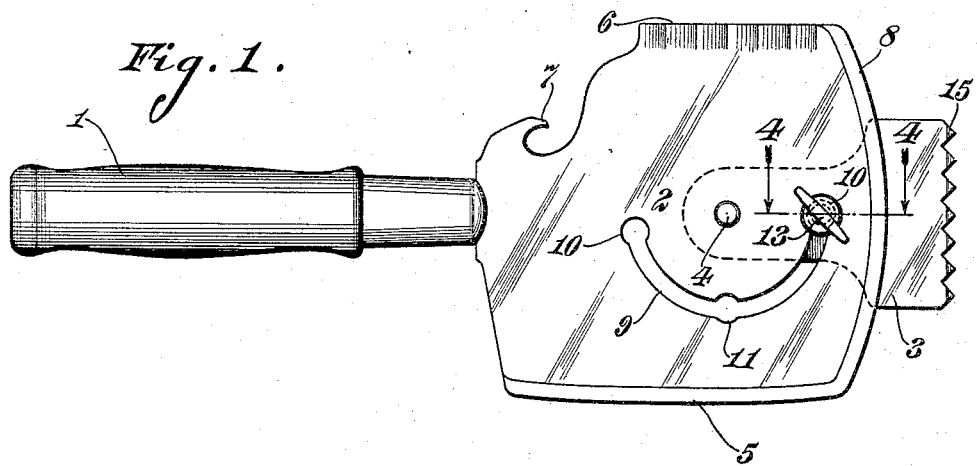
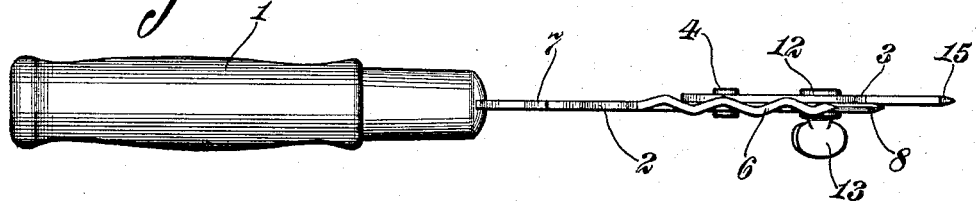
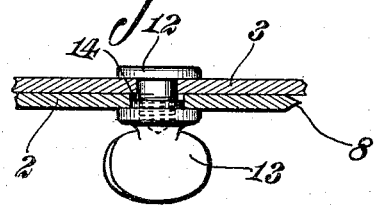
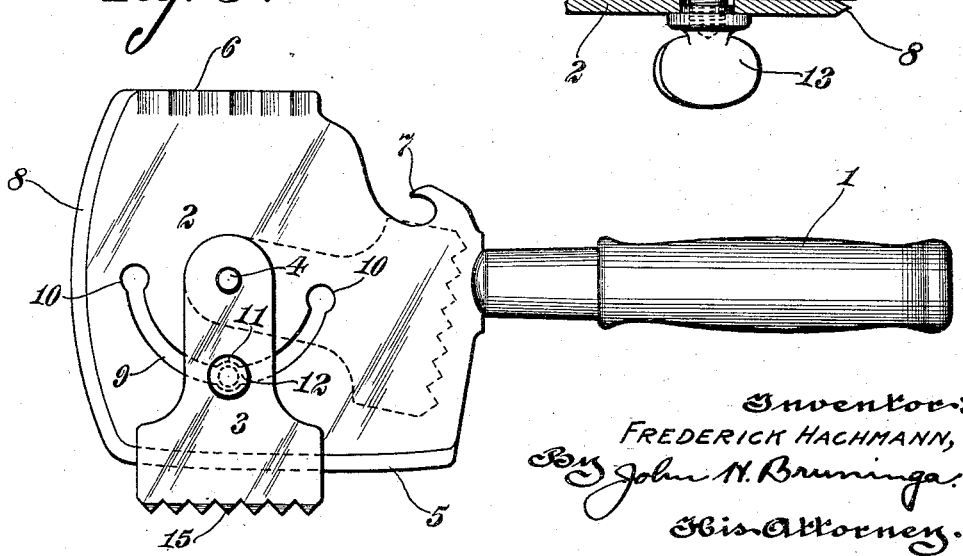
Inventor:
FREDERICK HACHMANN,
By John N. Bruninga.
His Attorney.

UNITED STATES PATENT OFFICE.

FREDERICK HACHMANN, OF ST. LOUIS, MISSOURI, ASSIGNOR OF ONE-HALF TO LEONARD MATTHEWS, JR., AND ONE-FOURTH TO ALBERT von HOFFMANN, BOTH OF ST. LOUIS, MISSOURI.

CULINARY IMPLEMENT.

1,194,838.     Specification of Letters Patent.     Patented Aug. 15, 1916.

Application filed April 3, 1916. Serial No. 88,679.

*To all whom it may concern:*

Be it known that I, FREDERICK HACHMANN, a citizen of the United States, and residing at St. Louis, State of Missouri, have invented a certain new and useful Improvement in Culinary Implements, of which the following is a specification.

This invention relates to kitchen implements and embodies in its general organization, a handle, a main blade mounted thereon and an auxiliary blade adjustably arranged on said main blade.

The performance of certain culinary operations such as chopping meats or vegetables, tendering steak, removing surplus bone from meats and cracking and chopping ice, calls into play an appliance specially adapted to the particular operation in hand. Heretofore, the culinary equipment for furthering these several operations, has embraced a number of separate and distinct tools, the result being that considerable trouble and annoyance follows in consequence of turning from one implement to another, and from other contingencies naturally arising in handling a number of implements for performing what frequently becomes the several successive steps in the one culinary operation.

This invention has among its objects to overcome the above noted objections by providing an implement adapted to all of the several operations above noted and which may, therefore, be conveniently manipulated in handling said operations where they constitute the several steps in the proper preparation of a certain food article.

A further object of the invention is to provide for the ready adjustment of the auxiliary blade to operative position and for readily locking said blade against accidental movement.

With these and other objects in view, the invention comprises the novel features of construction and combination of parts more fully hereinafter described.

In the accompanying drawings, Figure 1 is a side elevation of an implement embodying the invention, and showing the parts thereof in one relation; Fig. 2 is a plan or edge view of the same; Fig. 3 is a view similar to Fig. 1, but taken from the other side and showing the parts of the implement in another relation; and, Fig. 4 is a detail view in section.

Referring to the drawings, it will be seen that the implement embodies a handle 1, a main blade 2, and an auxiliary blade 3, adapted to lie flat against one side face of the main blade and pivoted thereto by means of a rivet or other pintle 4 passing through said blades at points adjacent the center of the main blade and rear or inner end of the auxiliary blade.

The blade 2, which follows the general contour outline of an ordinary cleaver blade, has its front active edge 5 curved and sharpened, as usual, and its opposite or rear edge corrugated, as seen more clearly in Fig. 2, to provide a series of blunt teeth or serrations 6 offset laterally in alternately opposite directions, for a purpose which will more fully hereinafter appear. The corrugated rear edge 6 is recessed, as shown, to provide a claw point 7, while the outer end of the blade is curved and sharpened to form a second active cutting edge 8.

Formed at an appropriate point in the blade 2 is an arcuate slot 9, struck from the pivotal point 4, as a center, and provided with terminal enlargements 10 and an intermediate enlargement 11, there being engaged with the blade 3 a bolt 12, disposed for travel in the slot 9, and equipped with a clamping nut 13 having a portion 14 adapted to fit the portions 10—11 of the slot and positively lock the blade 3 against movement. The forward or outer edge of the blade 3, which is adapted in certain relations to project beyond the edges of the blade 2, is provided with a series of sharpened, pointed teeth or serrations 15 for a purpose which will presently appear.

In practice, the blade 3 normally occupies the position shown by dotted lines in Fig. 3, being held in such position by the nut 13. By loosening the nut the blade 3 may be readily swung to a position for its serrated edge 15 to project beyond the end edge 8 or front edge 5 of the blade 2, as seen in Figs. 1 and 3 respectively. During movement of said blade from one to another of said positions, the bolt 11 travels in slot 9, as and for the purpose which will be readily understood, and when the blade is brought to rest it is locked through engagement of the nut with one of the end portions 10 or the intermediate portion 11 of the slot, as the case may be.

In action the implement may by bringing the cutting edge 5 into play be used as a cleaver or by bringing the toothed edge 6 into action, be operated as a meat tenderer, while the provision of the cutting edge 8 adapts the implement for use as a food or vegetable chopper. When the auxiliary blade 3 is moved to active position the implement may be employed for breaking and chopping ice and also for reducing meats or other food-stuffs to a finely reduced or macerated state. The claw point 7 may be utilized for removing bottle caps or the like.

From the foregoing, it is apparent that the invention accomplishes its stated objects in that the implement may be readily adapted to the uses and purposes of the several tools or implements which it is intended to replace. In attaining these ends various minor changes in the details herein described may be made without departing from the spirit or scope of the invention.

Having thus described the invention, what is claimed is:

1. A culinary implement of the type described, comprising a handle, a main blade mounted on said handle and consisting of a plate having a cutting edge and provided with a slot, an auxiliary blade lying at one side of and mounted directly on said main blade and movable to various operative positions thereon, said auxiliary blade lying normally within the surface plane of the main blade, and a clamping bolt movable with said auxiliary blade in said slot and operable for fixing said blades against movement relatively.

2. A culinary implement of the type described, comprising a handle, a main blade mounted thereon and provided with an arcuate slot having a plurality of enlargements, an auxiliary blade lying at one side of and pivoted directly upon said main blade and movable to a plurality of operative positions thereon, and a clamping bolt movable with said auxiliary blade in said slot and having a portion adapted for interlocking engagement with the enlarged portions of the latter to fix the said blade against movement.

In testimony whereof I affix my signature this 21st day of March, 1916.

FREDERICK HACHMANN.

Copies of this patent may be obtained for five cents each, by addressing the "Commissioner of Patents, Washington, D. C."